United States Patent
Lal et al.

(10) Patent No.: US 8,309,942 B2
(45) Date of Patent: Nov. 13, 2012

(54) SELF-POWERED ENVIRONMENTAL SENSOR WITH WAKE-UP CIRCUITRY

(75) Inventors: Amit Lal, Ithaca, NY (US); Rajesh Duggirala, Hillsboro, NY (US); Mvs Chandrasekhar, Ithaca, NY (US)

(73) Assignee: Cornell Research Foundation, Ithaca, NY (US)

( * ) Notice: Subject to any disclaimer, the term of this patent is extended or adjusted under 35 U.S.C. 154(b) by 546 days.

(21) Appl. No.: 12/441,832

(22) PCT Filed: Sep. 18, 2007

(86) PCT No.: PCT/US2007/020158
§ 371 (c)(1),
(2), (4) Date: Mar. 8, 2010

(87) PCT Pub. No.: WO2008/115202
PCT Pub. Date: Sep. 25, 2008

(65) Prior Publication Data
US 2010/0213379 A1    Aug. 26, 2010

Related U.S. Application Data

(60) Provisional application No. 60/845,423, filed on Sep. 18, 2006.

(51) Int. Cl.
*G21G 4/00* (2006.01)
(52) U.S. Cl. .................................................. 250/493.1
(58) Field of Classification Search .................. 250/285, 250/289, 336.1, 339.06, 390.01, 393, 493.1, 250/494.1, 496.1
See application file for complete search history.

(56) References Cited

U.S. PATENT DOCUMENTS

| | | | |
|---|---|---|---|
| 2,998,550 A | 8/1961 | Collins et al. | |
| 4,039,839 A | 8/1977 | Carlier | |
| 5,235,232 A | 8/1993 | Conley et al. | |
| 5,260,566 A | 11/1993 | Reed | |
| 5,479,919 A | 1/1996 | Aselage et al. | |
| 5,642,014 A | 6/1997 | Hillenius | |
| 5,708,957 A | 1/1998 | Chuang et al. | |
| 6,238,812 B1 | 5/2001 | Brown et al. | |
| 6,479,920 B1 | 11/2002 | Lal | |
| 6,818,897 B2 * | 11/2004 | Brown | 250/370.01 |
| 6,911,711 B1 | 6/2005 | Shimabukuro et al. | |
| 6,924,691 B2 * | 8/2005 | Beigel | 327/509 |
| 6,998,692 B2 | 2/2006 | Sanchez | |
| 2005/0248454 A1 | 11/2005 | Hanson | |
| 2007/0182362 A1 | 8/2007 | Trainor et al. | |

* cited by examiner

*Primary Examiner* — Mark R Gaworecki
(74) *Attorney, Agent, or Firm* — William Greener; Bond, Schoeneck & King, PLLC

(57) ABSTRACT

A self-powered sensor (e.g., 100, 180, 220, 400) can wake-up systems requiring a trigger signal to wake-up circuits or systems in power-sleep mode, conserving the battery power for emergency computations and communications. In a humidity sensor embodiment 100, radioisotope generated voltage biases are employed to power sensor capacitors to realize self-powered sensors. A first self-powered capacitor biasing architecture 160 is based on changes in the leakage resistance of the polymer capacitor 110, and a second self-powered capacitor biasing architecture 140 uses changes in the capacitance of the polymer capacitor. Another sensor embodiment uses changes in the capacitance or leakage resistance of the sensor capacitor to modulate conductance of a MOSFET 114, realizing an easily readable electronic output signal. A temperature sensor embodiment 180 and a MEMS cantilever structure based fissile material proximity sensor embodiment 400 are also disclosed.

13 Claims, 10 Drawing Sheets

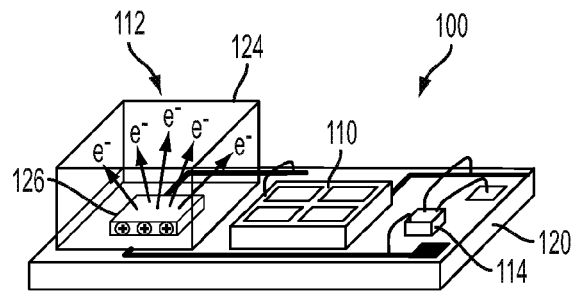
FIG. 1A
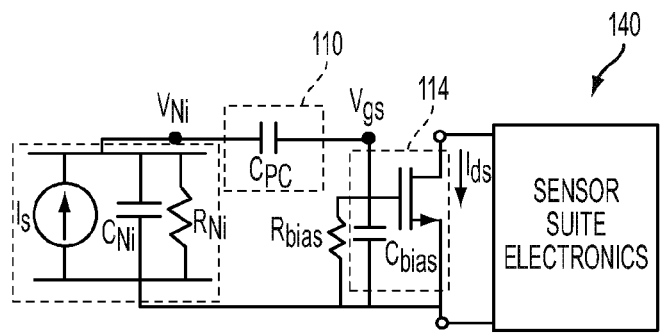
FIG. 1B
HUMIDITY ⇧ ⟹ $C_{PC}$ ⇧ ⟹ $V_{gs}$ ⇧ ⟹ $I_{ds}$ ⇧
$V_{gs} \approx$ FEW V's     $I_d \approx$ 100's μA
MOSFET AMPLIFICATION
FIG. 1C
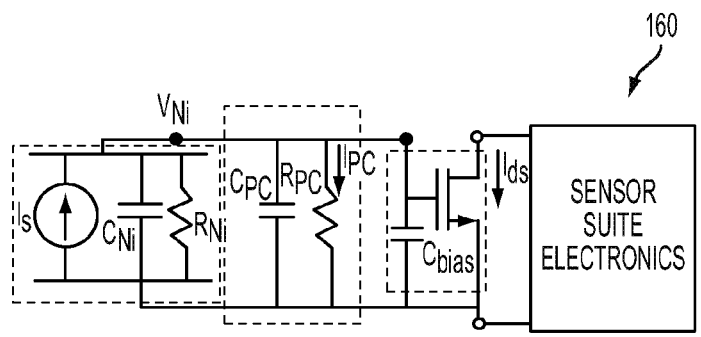
FIG. 1D
HUMIDITY ⇧ ⟹ $R_{PC}$ ⇩ ⟹ $I_{PC}$ ⇧ ⟹ $V_{Ni}$ ⇩ ⟹ $I_{ds}$ ⇩
$I_{PC} \approx$ 10's pA     $I_d \approx$ 100's μA
MOSFET AMPLIFICATION
FIG. 1E

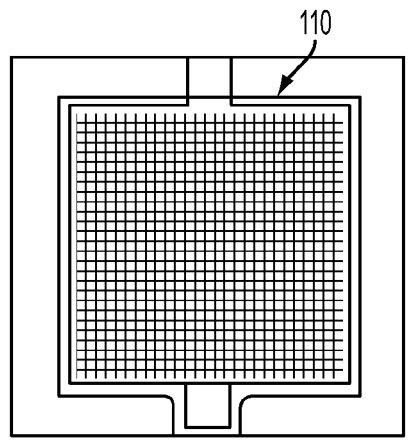
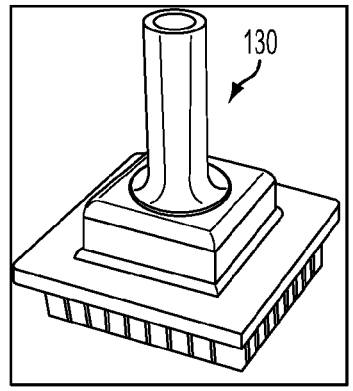
FIG. 3A  FIG. 3B
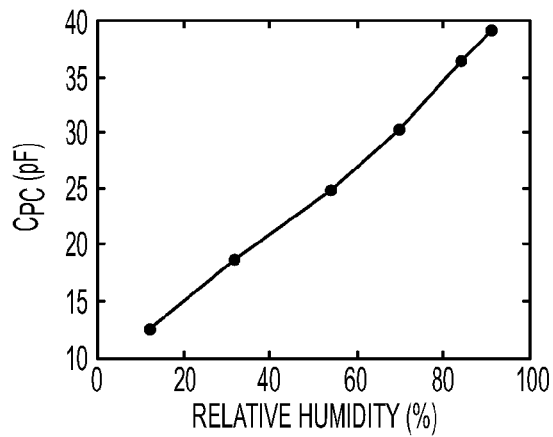
FIG. 4
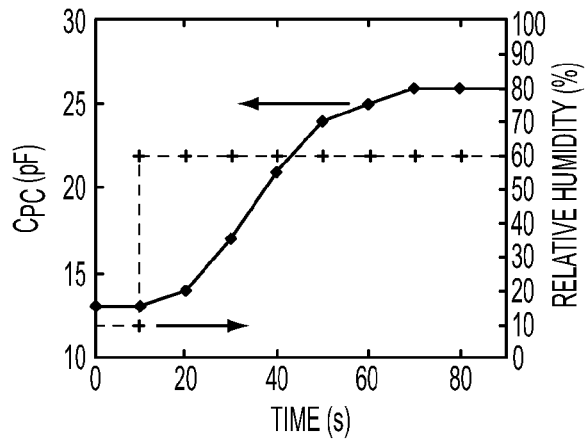
FIG. 5

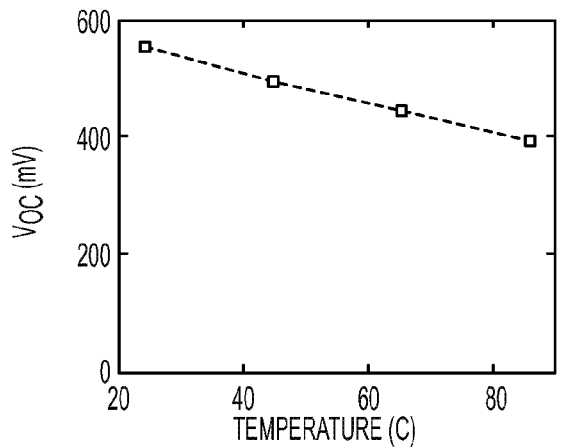
FIG. 9
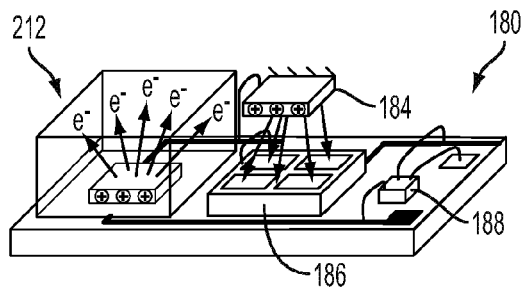
FIG. 10A
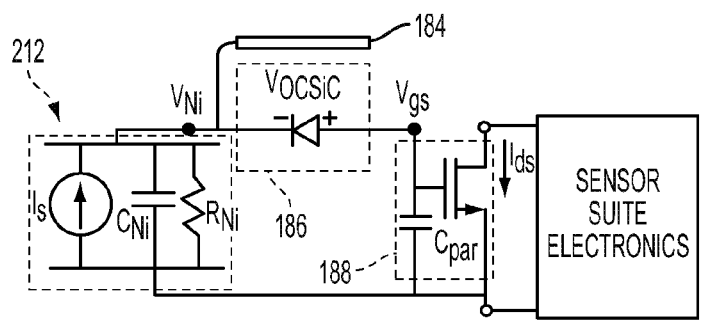
FIG. 10B
TEMPERATURE ⇑ ⇒ V$_{OCSiC}$ ⇓ ⇒ V$_{gs}$ ⇓ ⇒ I$_{ds}$ ⇓
V$_{OC}$ ≈ FEW 10mV's   I$_d$ ≈ 10's μA
MOSFET AMPLIFICATION
FIG. 10C

SELF-POWERED ENVIRONMENTAL SENSOR WITH WAKE-UP CIRCUITRY

CROSS REFERENCE TO RELATED APPLICATIONS

This application claims the benefit of priority under 35 U.S.C. 119(e) of: (a) U.S. Application No. 60/845,423 filed on Sep. 18, 2006 and (b) U.S. Application No. 60/942,842 filed on Jun. 1, 2007, the entire disclosures of which are incorporated herein by reference.

BACKGROUND OF THE INVENTION

1. Field of the Invention

The present invention relates in general to self powered sensors and methods for providing power to circuits and sensors embedded in systems adapted for use in hostile or remote environments.

2. Description of the Background Art

Wireless sensor suites deployed in remote and inaccessible areas need long operating lifetimes as battery monitoring and replacement is often cost-prohibitive. Such applications include long-term health monitoring of tactical missiles, industrial equipment, buildings, etc. In addition to efforts on increasing the lifetime of the conventional electrochemical batteries currently in use, work is being done on alternative power solutions. These approaches include powering the sensor suite using energy scavenged from ambient vibrations, solar radiation, tidal energy, etc. Additionally, alternative fuel-based power sources such as fuel cells and radioisotope power generators have also been proposed. All these solutions look promising, but are yet to be adopted widely.

An alternate approach to increasing the lifetime of battery powered sensor suites employs zero-power sensors, which can be passive or self-powered. Such self-powered sensors can wake-up the rest of the sensor node when required, conserving the battery power for emergency computations and communications. Self-powered sensors based on passive fiber-optics have been demonstrated, but fiber-optic based approaches require complicated signal processing for conversion of optical signals to electrical signals.

Fissile material detectors sensing neutrons and/or γ-rays can be divided into passive and active types. The active detectors are very sensitive but may consume significant power for operation and are thus unsafe for portable applications due to the interrogating irradiation. In contrast, passive detectors are low power consuming and small in size, but their sensitivity is often limited.

In view of the foregoing, a need remains for a method and apparatus for increasing the lifetime of powered sensor suites.

A need also remains for a self-powered fissile material detector having very high sensitivity.

SUMMARY OF THE INVENTION

The present invention addresses the foregoing needs with a method and apparatus for increasing the lifetime of battery powered sensor suites that employs zero-power sensors which can be passive or self-powered. Self-powered sensors can wake-up the rest of the sensor system when required, conserving the battery power for emergency computations and communications.

The sensor architecture of the present invention also provides, in an exemplary embodiment, a self-powered fissile material detector having very high sensitivity, employing both radioisotope biased electronic and mechanical amplification.

In a humidity sensor embodiment, radioisotope generated voltage biases are employed to power sensor capacitors to realize self-powered sensors. A first self-powered capacitor biasing architecture is based on changes in the leakage resistance of the polymer capacitor, and a second self-powered capacitor biasing architecture uses changes in the capacitance of the polymer capacitor.

Another sensor embodiment uses changes in the capacitance or leakage resistance of the sensor capacitor to modulate conductance of a MOSFET, realizing an easily readable electronic output signal. The exemplary self-powered sensors employ a radioisotope powered humidity sensitive polymer capacitor to modulate the conductance of a MOSFET. The current modulation of the MOSFET is enough to wake-up a circuit in power-sleep mode.

A temperature sensor embodiment provides a linear temperature sensor that can operate over a wide temperature range in harsh environments. Radioisotope illumination of SiC betavoltaics generates a temperature dependant voltage reference. Using the architecture of the present invention, a self-powered sensor provides a linear temperature sensitivity of −3 mV/K from 30 C to 130 C, with potential temperature range extending from minus 200° C. to plus 400° C.

The sensor topology of the present invention is readily adapted to sensing other physical phenomena including shock and chemical concentrations. The sensors of exemplary embodiments of the present invention consume zero-battery-power and can potentially extend the lifetime of condition monitoring sensor suites to multiple decades. These zero-battery-power sensors allow event-based power management of unattended sensor systems and orders of magnitude reduction in average power consumption.

Preferably, the sensors employ Nickel-63, a safe radioisotope for which power output is nearly independent of the ambient conditions, and Nickel-63 can have several decades of useful life, since the half-life is 100.2 years. For example, a 2-milliCurie Nickel-63 thin-film emits low energy (average energy=17 keV) β-particles with penetration depths <10 μm in solids. As a result, Nickel-63 can be deployed safely without substantial shielding or concerns about security.

A MEMS cantilever structure-based fissile material proximity sensor embodiment provides an improved means for the detection and prevention of the clandestine transport of fissile materials (including $^{235}$U and $^{239}$Pu), substances used for producing weapons of mass destruction. The sensor detects both the neutrons and the relatively high intensity of γ rays (E.g. >3:0 MeV) that are emitted from short-lived fission fragments Incident neutrons/γ rays passing through a metal shield excite phosphors, which in turn excite electron hole pairs in a SiC betavoltaic, raising the open circuit voltage of the betavoltaic, which in turn increases the actuation voltage of a cantilever, and leads to pull-in of the cantilever while it has been radioisotopically biased near pull-in. An indirect conversion of neutrons/γ rays to voltage is employed because the radiation resistant radio luminescent phosphors are necessary to shield the SiC betavoltaic from radiation damage.

The use of micro-mechanical switches results in a complete "1" or "0" switching, can be used to "wake-up" the sensor electronics, which might be "asleep" until something is detected, and hence conserve battery power. The detector is optionally configured to consume zero power when in "detect" mode, allowing long term monitoring in hostile environments where battery replacement is not feasible, and the power required to bias the cantilevers are provided by a radioactive thin film. The beta particles generate Bremsstrahlung, whose energy is low enough (<80 keV) that will not interfere with the higher energy X-rays to be detected due to external fission.

The features and advantages of the present invention will become apparent from the following detailed description of a number of preferred embodiments thereof, taken in conjunction with the accompanying drawings.

BRIEF DESCRIPTION OF THE DRAWINGS

FIG. 1a is a perspective view of the hybrid on-chip radioisotope powered humidity sensor, in accordance with a preferred embodiment of the present invention.

FIG. 1b is a schematic diagram illustrating an electrical equivalent circuit of the capacitive divider architecture for the hybrid on-chip radioisotope powered humidity sensor, in accordance with a preferred embodiment of the present invention.

FIG. 1c is a schematic diagram illustrating the working principle of the capacitive divider architecture for the hybrid on-chip radioisotope powered humidity sensor, in accordance with a preferred embodiment of the present invention.

FIG. 1d is a schematic diagram illustrating an electrical equivalent circuit of the leakage resistance architecture for the hybrid on-chip radioisotope powered humidity sensor, in accordance with a preferred embodiment of the present invention.

FIG. 1e is a is a schematic diagram illustrating the working principle of the leakage resistance architecture for the hybrid on-chip radioisotope powered humidity sensor, in accordance with a preferred embodiment of the present invention.

FIG. 3a is a photograph of a plan view of the polymer capacitor for the radioisotope powered humidity sensor, in accordance with a preferred embodiment of the present invention.

FIG. 3b photographic perspective view of the polymer capacitor testing package for the radioisotope powered humidity sensor, in accordance with a preferred embodiment of the present invention.

FIG. 4 is a plot of capacitance vs. relative humidity ("RH") using a 22 pF@45% RH polymer capacitor in the radioisotope powered humidity sensor, in accordance with a preferred embodiment of the present invention.

FIG. 5 is a plot illustrating the transient response of the polymer capacitor in an environmental chamber, when subjected to a step increase in RH from 0 to 60% RH, in accordance with a preferred embodiment of the present invention.

FIG. 9 is a plot illustrating variation in open circuit voltage with temperature in the radioisotope powered temperature sensor, in accordance with a preferred embodiment of the present invention.

FIG. 10a is a perspective view of the radioisotope powered temperature sensor, in accordance with a preferred embodiment of the present invention.

FIG. 10b is a schematic diagram illustrating an electrical equivalent circuit of the capacitive divider architecture for the radioisotope powered temperature sensor, in accordance with a preferred embodiment of the present invention.

FIG. 10c is a schematic diagram illustrating the working principle of the capacitive divider architecture for the radioisotope powered temperature sensor, in accordance with a preferred embodiment of the present invention.

DETAILED DESCRIPTION OF THE PREFERRED EMBODIMENTS

Figure 2A:
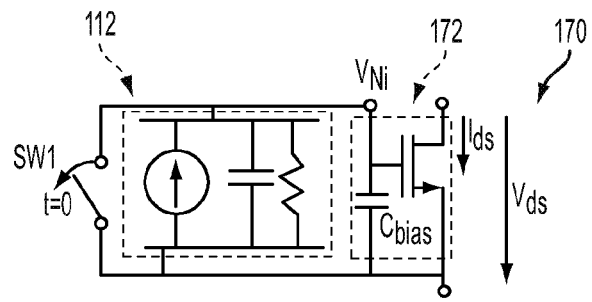
FIG. 2a is a schematic diagram illustrating the radioisotope bias generation test circuit of the hybrid on-chip radioisotope powered humidity sensor, in accordance with a preferred embodiment of the present invention.

As shown in FIGS. 1a-1e, hybrid on-chip radioisotope powered humidity sensor 100 comprises a polymer capacitor $C_{PC}$ 110, a radioisotope source 112 and a transistor, preferably a MOSFET 114. Sensor 100 in prototypes has been configured on a substrate or printed circuit board 120 which supports a conductive metal package or box-shaped shield 124 that functions as a collector for charge emitted from a radioisotope emitter such as the Nickel-63 thin film segment 126. Radioisotope source 112 effectively provides a current source $I_S$, shunted by an intrinsic capacitance $C_{Ni}$ and resistance $R_{Ni}$, across which are developed a radioisotope source voltage $V_{Ni}$, as shown in FIG. 1b.

Radioisotope source 112 generates voltage biases employed to power polymer capacitor $C_{PC}$ 110 for the self-powered sensor 100. Self-powered humidity sensor 100 can significantly extend the operating lifetime of battery powered wireless sensor suites. There are two capacitor biasing architectures. Leakage resistance architecture 160 (shown in FIGS. 1a, 1d and 1e) is based on changes in the leakage resistance of polymer capacitor $C_{PC}$ 110, and Capacitor Divider architecture 140 (shown in FIGS. 1a, 1b and 1c) is based on changes in the capacitance of the polymer capacitor $C_{PC}$ 110. Changes in the capacitance or leakage resistance of the sensor capacitor $C_{PC}$ 110 modulates the conductance of MOSFET 114, realizing an easily readable electronic output. The current modulation of MOSFET 114 is readily used in generating a triggering signal to wake-up a circuit in power-sleep mode.

The sensor topology of the present invention can be readily adapted to sensing other physical phenomena including temperature, shock, chemical concentrations, as will be discussed in greater detail below. Sensor 100 consumes zero-battery-power and can potentially extend the lifetime of condition monitoring sensor suites to multiple decades. These zero-battery-power sensors allow event-based power management of unattended sensor systems and orders of magnitude reduction in average power consumption.

Radioisotope source 112 preferably uses Nickel-63, a safe radioisotope with power output that is nearly independent of the ambient conditions. Radioisotope source 112 can have several decades of useful life as the half-life for Nickel-63 is 100.2 years. A 2-milliCurie Nickel-63 thin-film (e.g., 126) emits low energy (average energy=17 keV) β-particles with penetration depths <10 μm in solids (such as collector 124). As a result, it can be deployed safely without substantial shielding or concerns about security.

Theory

Radioisotope Biasing

Radioisotope source 112 includes an electrically isolated β-particle emitting radioisotope thin-film that always develops a voltage bias because of the continuous emission of electrons. The voltage bias level depends on the balance between the voltage dependant charge leakages from the film into ambient air and the electron current output from the source. Hence, weak sources with low current output (e.g. 1-millicurie outputs ~5.9 pA) need to be placed in vacuum (~1-1000 mtorr) to achieve voltage biases in the 1-20V range.

The voltage bias is used on the radioisotope thin-film to bias the gate of MOSFET 114, via a humidity sensitive polymer capacitor $C_{PC}$ 110 which modulates the bias.

One may choose between the two architectures, depending on the leakage resistance $R_{PC}$ of the capacitors. Since the current output from the source is just 10.2 pA, anything connected across the radioisotope-collector should have impedance greater than or equal to 100 GΩ. Capacitors with $R_{PC} \gg 1000$ GΩ can be placed in a series stack as shown in FIG. 1(b), with the capacitor ratio in the stack controlling the gate voltage $V_{gs}$ of the MOSFET as follows:

$$V_{gs} = V_{Ni} \frac{C_{PC}}{(C_{PC} + C_{bias})}, \text{ for } R_{PC} \gg 1000 \text{ GΩ}$$

For capacitors with $R_{PC} \sim 1000$ GΩ, capacitor divider architecture 140 cannot be used as the leakage resistance of the polymer capacitor starts to dominate. The ratio of the leakage resistances of $C_{PC}$ and $C_{bias}$ starts controlling $V_{gs}$, and since the leakage resistance of the on-chip capacitor $R_{bias} \gg 1000$ GΩ, any variation in resistance due to humidity doesn't alter $V_{gs}$ significantly. In such cases, the polymer capacitors can be connected directly across the gate and source of the MOSFET 114 using leakage resistance architecture 160 as shown in FIG. 1(d). Since $V_{gs}$ is then given by $$V_{gs} = I_s R_{PC}, \text{ for } R_{Ni} \gg R_{PC}.$$

Any change in the humidity that alters the leakage resistance in the capacitor will change $V_{gs}$, and hence the conductance of the MOSFET 114 which amplifies the change in the capacitor current, making the signal processing easy.

Humidity Sensitive Polymer Capacitor

In a humidity sensitive capacitor (e.g., $C_{PC}$ 110), a polymer or other porous dielectric layer absorbs water from the atmosphere. The large polarizability of the absorbed water molecules alters the capacitance between the electrodes on either side of the material. That final capacitance can be calculated by modeling the moist polymer as a composite material, as follows $$C = \frac{\varepsilon_0 A}{d} * (\varepsilon_p + f_w * (\varepsilon_w - \varepsilon_p)).$$

Here, C is the capacitance of the structure, A is the electrode area, $\varepsilon_p$ is the relative dielectric constant of the polymer dielectric, $\varepsilon_w$ is the relative dielectric constant of water, and $f_w$ is the volume fraction of water within the polymer. The capacitance of the structure depends primarily on the geometry, but the sensitivity and transient response of the structure depend on $f_w$, which can be controlled by varying the electrode mesh size on the top electrode.

In addition to the capacitance, the leakage resistance of the layer stack is also a critical parameter. Nominally, this leakage resistance is extremely high, meaning that the conductivity of the polymer dielectric is low, as would be expected. However, as water is absorbed, ionic groups within the material are disassociated, thereby increasing the conductivity between the electrodes. The resistance of the structure can also be modeled by treating the moist polymer as a composite material, as follows $$R^{-1} = \left(\frac{L}{A}\rho_p\right)^{-1} + \left(\frac{L}{A}f_w\rho_w\right)^{-1}.$$

Here, R is the resistance of the capacitor, L is the thickness of the dielectric, A is the capacitor's electrode area, $\rho_p$ is the conductivity of the polymer, $\rho_w$ is the conductivity of the water and disassociated ionic species, and $f_w$ is the volume fraction of water absorbed within the dielectric. The resistance depends primarily on the material processing and the existence of impurities within the material. Leakage resistances ranging from 10 GΩ to >10 TΩ have been demonstrated. Furthermore, at these large levels of resistance, other charge leakage mechanisms, including the removal of charge directly from the electrode surface through interactions with the external gas, become significant percentages of total current through the circuit. These mechanisms must be mitigated through careful attention to packaging, interconnect lengths, and electrical isolation.

Testing

The discrete components of an exemplary embodiment were first characterized individually, and then assembled in a vacuum chamber to test the system for functionality.

Radioisotope Voltage Source

Figure 2B:
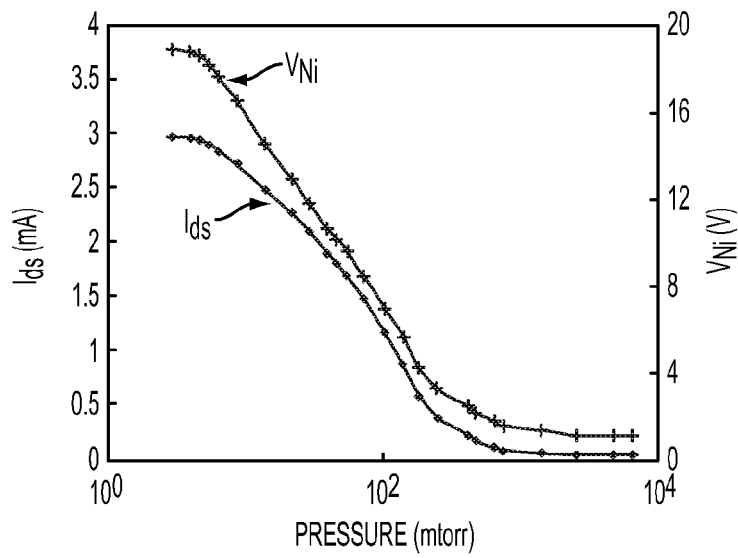
FIG. 2b is a plot of measured $I_{ds}$ vs. pressure@$V_{ds}$=5 volts, with switch SW1 open for the radioisotope powered humidity sensor, in accordance with a preferred embodiment of the present invention.
Figure 2C:
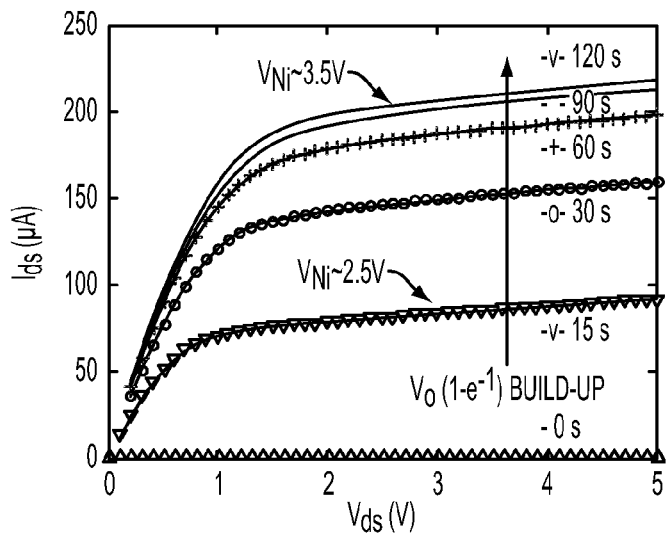
FIG. 2c, is a plot of the measured shift in MOSFET $I_{ds}$-$V_{ds}$ characteristics with an exponential build-up of radioisotope bias after opening the switch SW1 for the radioisotope powered humidity sensor, in accordance with a preferred embodiment of the present invention.

Radioisotope source 112 includes enclosed in a 2"×2"×1" metal (e.g., aluminum) box 124, which encloses and serves as a collector for the electrons emitted from Ni-63 thin film segment 126. The voltage bias build-up on the thin-film depends on the collector material, the source-collector geometry and placement, and the pressure in the vacuum chamber. The aluminum box collector 124 was chosen for the proof-of-concept experiments and may be further optimized, but this is the preferred embodiment as of this writing. These experiments resulted in a preferred embodiment of the method of the present invention, which follows The radioisotope source-collector (or, taken together, Radioisotope source 112) were connected across the gate-source of an N-MOSFET 172 as shown in FIG. 2(a). The chamber was then pumped down and the $I_{ds}$ at $V_{ds}$=5V monitored (FIG. 2(b)) during pump-down. This was used to characterize the bias generation with respect to pressure. The corresponding $V_{gs}$ was calculated from the $I_{ds}$-$V_{gs}$ curve measured for MOSFET 172. As expected, lower pressure results in fewer particles getting ionized, or lower charge leakages, and hence higher voltage bias generated. Measurements show that moderate levels of vacuum (~100 millitorr) are sufficient for the operation of the bias generation. At atmospheric pressure, a drain current of 26 μA was measured for an applied drain voltage of 5V, indicating a build-up of 1.05V on the radioisotope source. To further confirm that radioisotope source 112 generated the bias, the radioisotope source-collector capacitor was shorted by first closing switch SW1, and then opening switch SW1. The $I_{ds}$-$V_{ds}$ for the MOSFET was measured at periodic intervals to illustrate exponential build-up of thin-film voltage due to the constant emission of electrons from Nickel-63 segment 126.

Humidity Sensitive Polymer Capacitor

Referring now to FIGS. 3a and 3b, the devices were characterized at the die level and suitable devices epoxy attached in a ceramic pin grid array package. A copper lid with a ¼" pipe fitting 130 was then soldered onto the package. This was for the interface with the gas feed-through in the vacuum chamber which would expose the sensor capacitor 110 to the external atmosphere. The package was placed inside a controlled environmental chamber for testing at various levels of humidity. The device capacitance was measured at various levels of humidity (see FIG. 4). For 2 mm by 2 mm devices with 20% of the top electrode exposed to the atmosphere, a sensitivity of 0.33 pF/% RH was measured with a capacitance delay time constant of approximately 50 s (see FIG. 5).

Self-Powered Humidity Sensor

For the self-powered humidity sensor demonstration, the radioisotope source-collector 112, the humidity sensor package and the MOSFET chip were assembled in the vacuum chamber. The humidity sensor was exposed to atmosphere through a gas feed-through. The opening of the gas feed-through was exposed to a solution of sodium chloride to achieve 75% Relative Humidity ("RH") at thermal equilibrium. Leaving the gas feed-through exposed to ambient resulted in an estimated 30% RH. Two types of sensors were tested. One type was designed to have polymer capacitors (e.g., $C_{PC}$ 110) with $R_{PC}$>>1 TΩ, and the other with $R_{PC}$~1 TΩ.

Figure 6:
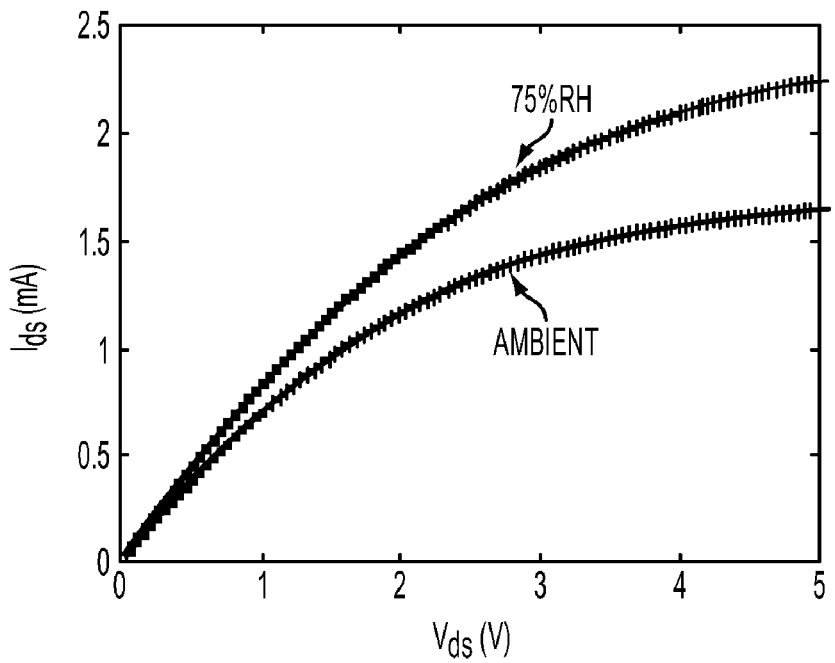
FIG. 6 is a plot illustrating the measured shift in capacitive divider architecture's I-V characteristics as RH increases, in accordance with a preferred embodiment of the present invention.

For the sensor using high $R_{PC}$ polymer capacitor, the components were connected in the capacitive divider architecture 140 (FIG. 1(b)) and the chamber pumped down with the sensor feed-through exposed to ambient. The MOSFET $I_{ds}$-$V_{ds}$ was measured at two different values of humidity and an expected upward shift (FIG. 6) observed at elevated humidity levels. As the humidity increases, the capacitance of the sensor increases, raising the voltage bias on the gate of the MOSFET, and that consequently modulates drain current. From measured $I_{ds}$, $C_{PC}$ was estimated to be ~28 pF. Both the calculated values were close to the measurements made on the polymer capacitor.

Figure 7:
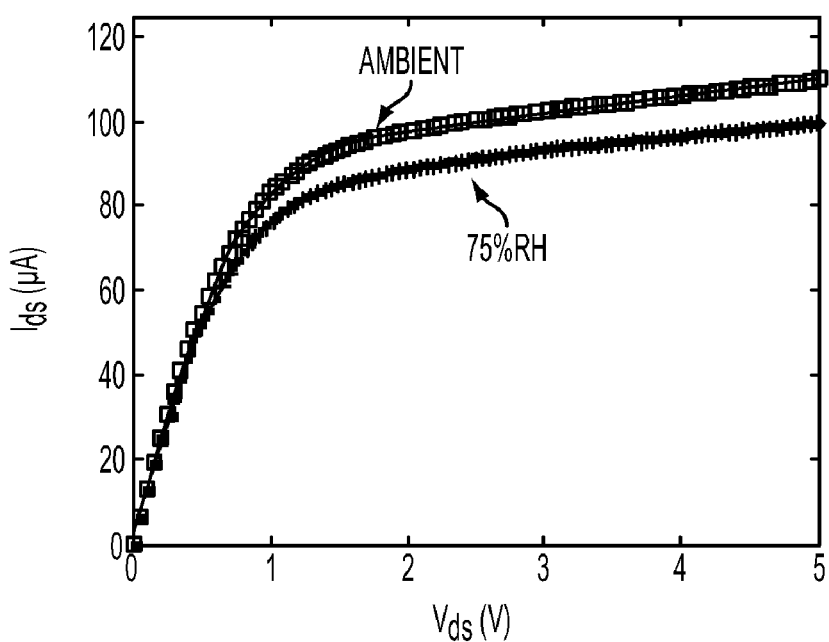
FIG. 7 is a plot illustrating the measured shift in leakage resistance architecture's I-V characteristics as RH increases, in accordance with a preferred embodiment of the present invention.
Figure 8A:
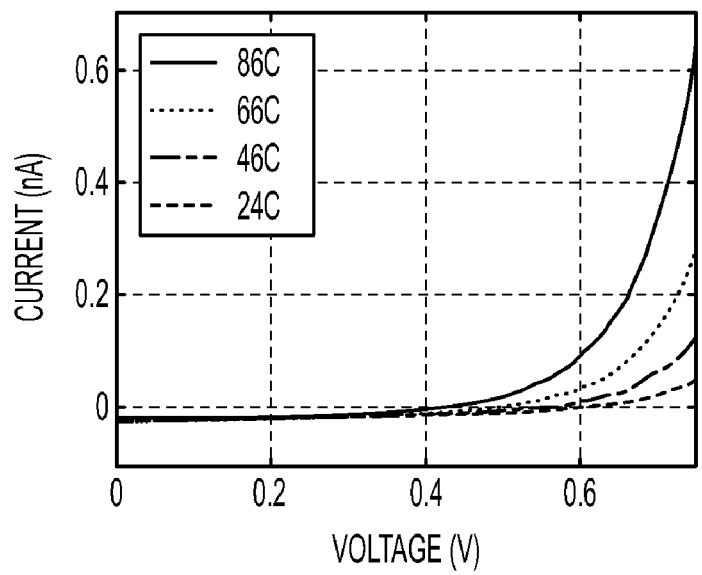
FIG. 8a is a plot illustrating, for four selected temperatures, the temperature-dependant I-V characteristic in the radioisotope powered temperature sensor, in accordance with a preferred embodiment of the present invention.
Figure 8B:
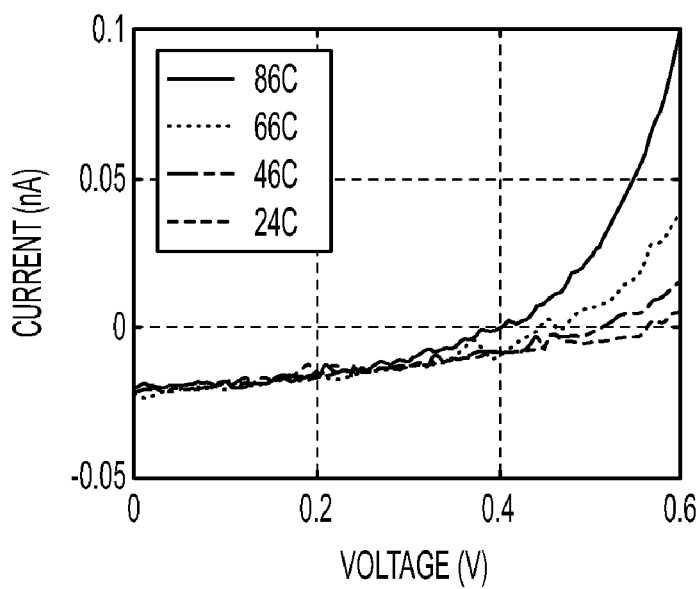
FIG. 8b is a second plot illustrating, for the four selected temperatures, the temperature-dependant I-V characteristic in the radioisotope powered temperature sensor, in accordance with a preferred embodiment of the present invention.

For the sensor using $R_{PC}$~1 TΩ polymer capacitor, the components were connected in the leakage resistance architecture 160 (FIG. 1(d)). The MOSFET $I_d$-$V_{ds}$ was measured at two different values of humidity and an expected downward shift (FIG. 7) observed at elevated humidity levels. As the humidity increases, the leakage in the capacitor increases, pulling the voltage bias down and hence reducing the drain current.

Self-Powered Temperature Sensor

Turning now to FIGS. 8a-14, a linear temperature sensor 180 operates over a −200 C to 400 C temperature range. Temperature sensor 180 can also operate in harsh environments.

In the temperature sensor of the present invention, radioisotope illumination of SiC betavoltaics is employed to generate a temperature dependant voltage reference signal. Using temperature sensor architecture 180 of FIGS. 10a and 10b, a self-powered sensor with a linear temperature sensitivity of −3 mV/K from 30° C. to 130° C. is demonstrated, with a potential temperature range extending to 400° C.

The demonstrated sensor topology of FIGS. 10a and 10b can also be readily adapted to sensing other physical phenomena including temperature, shock, chemical concentrations. Temperature sensor 180 consumes zero-battery-power and can potentially extend the lifetime of condition monitoring sensor suites to multiple decades, allowing event-based power management of unattended sensor systems and orders of magnitude reduction in average power consumption.

Temperature sensor 180 also preferably uses the Nickel-63 radioisotope, for which the 2-milliCurie Nickel-63 thin-film emits low energy (average energy=17 keV) β-particles with penetration depths <10 μm in solids. As a result, it can be deployed safely without substantial shielding or concerns about security. Other materials may be used as desired.

Theory

Radioisotope Illumination of SiC Betavoltaics Using Two Nickel-63 Sources

Temperature sensor 180, as shown in FIGS. 10*a* and 10*b* includes a source/collector 212 as well as a second Nickel-63 source 184 positioned in close proximity to illuminate SiC diode 186. SiC diode 186 was initially characterized for variation of the open circuit voltage with temperature, with the 2$^{nd}$ Ni-63 source providing the illumination, as illustrated in the plot of FIG. 9.

$I_{sc}$=20pA

Integration of Self-Powered Amplifier for Higher Sensitivity:

In accordance with the method of present invention, a 3 mCi Ni-63 source foil was placed inside a 6"×6"×6" cube (to provide a radioisotope source 212, and connected to SiC photodiode 186 and MOSFET 188 as shown in FIGS. 10*a* and 10*b*. A 0.5 mCi/cm$^2$ Nickel-63 source 184 was placed over SiC diode 186 to provide a baseline reference illumination, and connected to the high voltage node ($V_{Ni}$) in the circuit. As noted above with regard to the previously described embodiments, radioisotope source 212 effectively provides a current source $I_S$, shunted by an intrinsic capacitance $C_{Ni}$ and resistance $R_{Ni}$, across which are developed a radioisotope source voltage $V_{Ni}$, as shown in FIG. 10*b*. The SiC chip 184 and MOSFET chip were placed outside the vacuum chamber and connections were made using coax cables.

Figure 11:
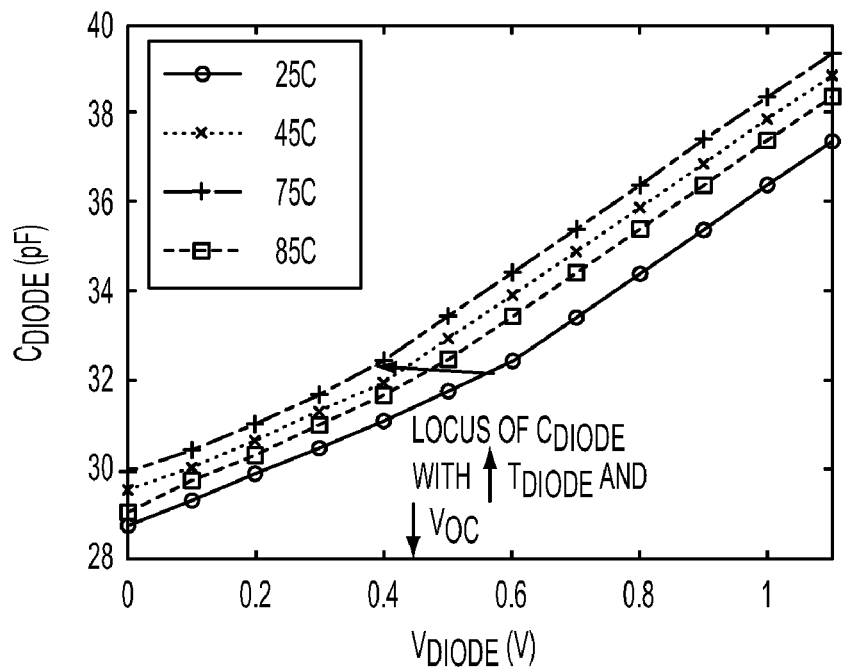
FIG. 11 is a plot illustrating measured variation in the capacitance of the betavoltaic with temperature for the radioisotope powered temperature sensor, in accordance with a preferred embodiment of the present invention.
Figure 12:
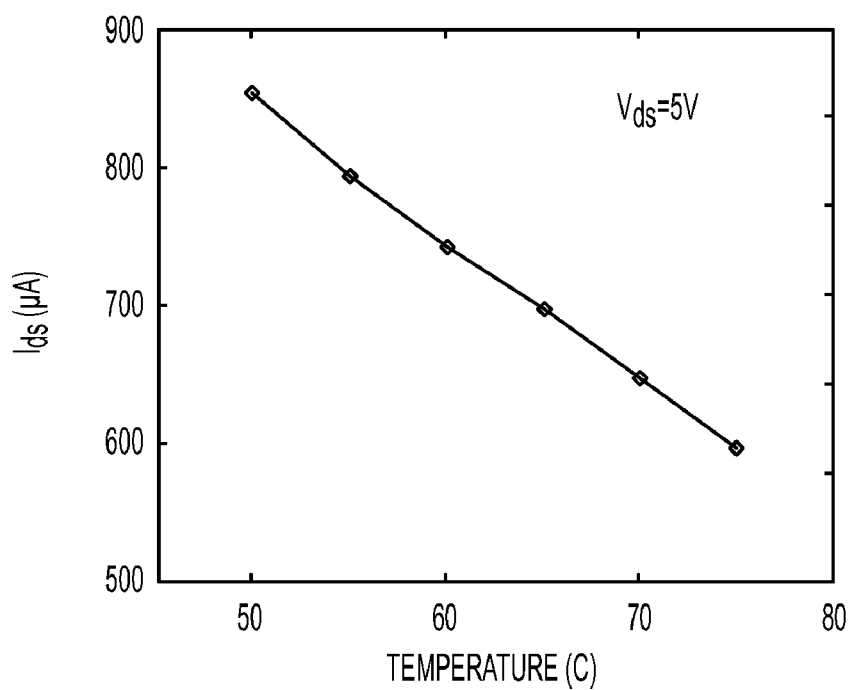
FIG. 12 is a plot illustrating measured variation of drain-source current $I_{ds}$ with temperature for the radioisotope powered temperature sensor, in accordance with a preferred embodiment of the present invention.

The measured sensitivity for temperature sensor 180 is illustrated in the plot of FIG. 11. The Ni-63 bias generator was then connected to the MOSFET gate and the Ids-Vds characteristic was measured to estimate the bias level, which was calculated to be 21.2V.

The SiC diode 186 was then included in the circuit and the Ids@Vds=5V was found to drop to 7.24 mA, or Vgs=6.75V. This was attributed to the capacitive division arising from the parasitic capacitance to ground. The Cd and Cpar were measured to be 2.14.

The whole circuit was then connected and the MOSFET gate voltage bias found to drop to 2.5-2.8V. This was attributed to the current leakage from the Ni-63 source 184 placed outside vacuum which was used to illuminate the SiC diode.

The temperature of the SiC diode 186 was then varied and the Ids of the MOSFET 188 monitored with Vds=5V. As expected, the Ids dropped with rising temperature as shown in the plotted data of FIG. 11, in which the slope was measured to vary between 9.5 uA/C and 10.5 uA/C over 6-7 temperature cycles.

Figure 13:
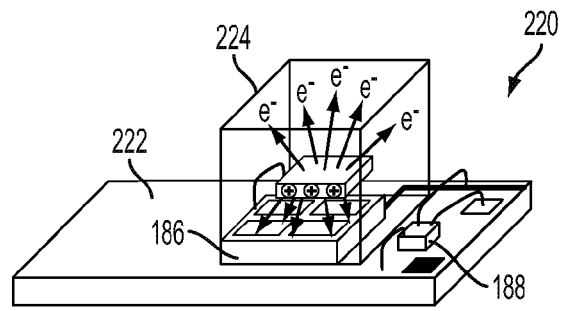
FIG. 13 is a perspective view of the radioisotope biased temperature sensor, in accordance with a preferred embodiment of the present invention.

FIG. 13 illustrates another embodiment of the temperature sensor of the present invention. Compact radioisotope biased temperature sensor 220 includes a substrate or printed circuit board 222 with conductive traces connecting the SiC photo/rad detector or diode 186 to MOSFET chip 188, as before. In the compact sensor 220, an aluminum collector 224 encloses both the Ni-63 source and the SiC diode 186, such that collector 224 provides a metal vacuum package also acting as a collector for emitted charge used to power operation of the sensor.

Figure 14A:
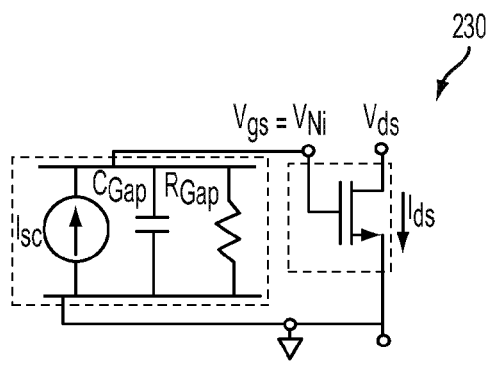
FIG. 14a is a schematic diagram of the electrical circuit for the radioisotope biased sensor, in accordance with a preferred embodiment of the present invention.
Figure 14B:
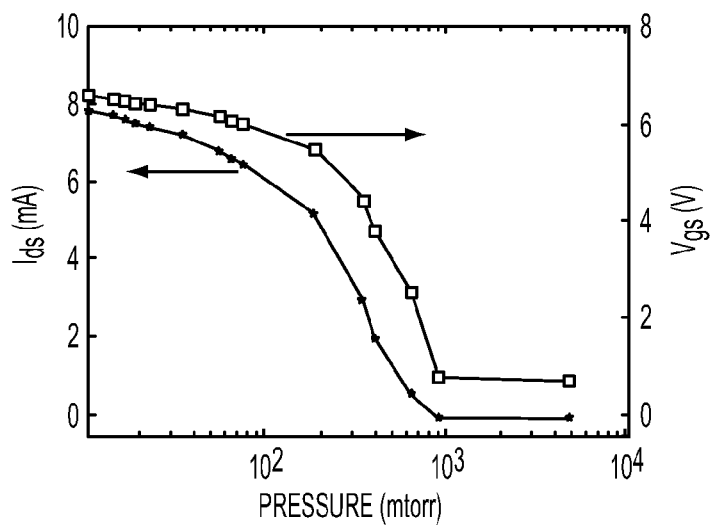
FIG. 14b is a plot illustrating measured variation of drain-source current $I_{ds}$ with pressure for the radioisotope biased sensor, in accordance with a preferred embodiment of the present invention.

Other experimental embodiments have shown promise for compact sensor applications. For example, FIG. 14*a* is a schematic diagram of the electrical circuit for another embodiment of the radioisotope biased sensor 230 and FIG. 14*b* is a plot illustrating measured variation of drain-source current $I_{ds}$ with pressure for the radioisotope biased sensor.

Radioisotope Biased Mechanical Cantilever Amplifier Based Zero-Power Sensor

Turning now to FIGS. 15-18, another embodiment of the sensor and method of the present invention includes radioisotope biased mechanical cantilever amplifier based zero-power sensors that can enable completely autonomous high sensitivity sensor systems or significantly extend the operating lifetime of battery powered wireless sensor suites employed in hostile environments where periodic battery replacement is not feasible.

Thin-film radioisotope generated voltage biases are used to electrostatically actuate cantilevers connected electrically in series with diode sensor. At equilibrium, the cantilever is biased slightly below its pull-in voltage. A change in the measurand leads to a change in the voltages across the diode sensor, resulting in changes in the actuation voltage of the cantilever. Any small change can be magnified by triggering pull-in in the cantilever, and hence lead to sensitive detection. This sensor architecture is well suited for use in a zero-powered fissile material detector.

In accordance with this embodiment of present invention a self-powered radiation sensor based on radioisotope biased mechanical cantilever amplifiers. However, the demonstrated sensor topology can be readily adapted to sensing other physical phenomena including temperature, shock, chemical concentrations. Our sensor consumes zero-battery-power and can potentially extend the lifetime of condition monitoring sensor suites to multiple decades. These zero-battery-power sensors allow event-based power management of unattended sensor systems and orders of magnitude reduction in average power consumption.

Here again, the Nickel-63 radioisotope's power output is nearly independent of the ambient conditions, and can have several decades of useful life as the half-life is 100.2 years. A 2-milliCurie Nickel-63 thin-film emits low energy (average energy=17 keV) β-particles with penetration depths <10 μm in solids. As a result, it can be deployed safely without substantial shielding or concerns about security.

Theory

Radioisotope Biasing

An electrically isolated β-particle emitting radioisotope thin-film always develops a voltage bias because of the continuous emission of electrons. See, e.g., voltage bias test circuit 230 as shown in FIG. 14*a*. The voltage bias level depends on the balance between the voltage dependant charge leakages from the film into ambient air and the electron current output from the source. Hence, weak sources with low current output (e.g. 1-millicurie outputs ~5.9 pA) need to be placed in vacuum (~1-1000 mtorr) to achieve voltage biases in the 1-20V range. Bias from a radioisotope source is used here for the first time to bias mechanical amplifier elements such as switches.

Mechanical Amplifier

Figure 15:
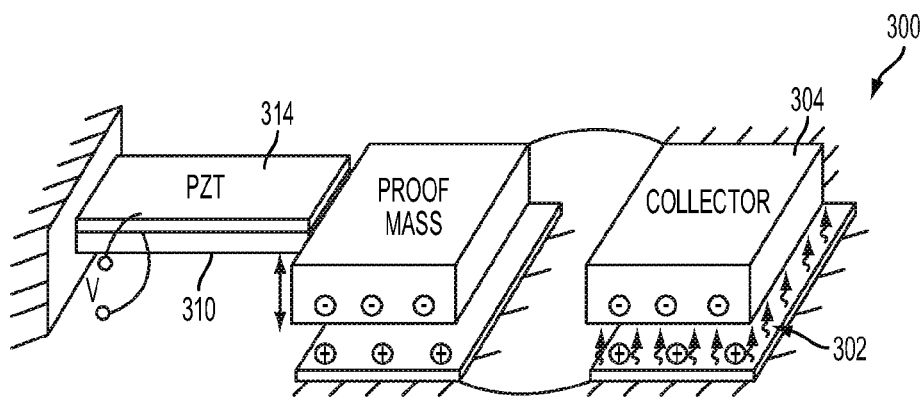
FIG. 15 is a perspective view illustrating the radioisotope biased mechanical amplifier, in accordance with a preferred embodiment of the present invention.
Figure 16:
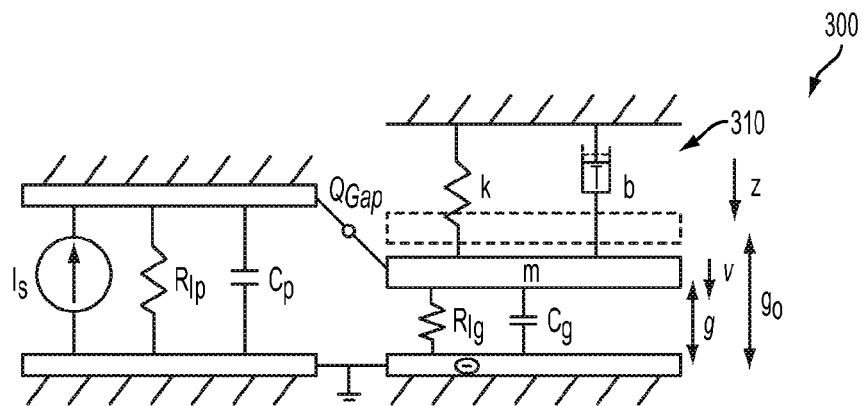
FIG. 16 is a diagram illustrating an electro-mechanical equivalent representation of the radioisotope biased mechanical amplifier, in accordance with a preferred embodiment of the present invention.

Electrostatic actuation of cantilevers using the voltage biases realized by radioisotope charging of capacitors is shown in FIG. 15, illustrating the radioisotope biased mechanical amplifier 300. The electromechanical equivalent is showed in FIG. 16. Ni-63 source 302 is proximate collector 304. A proof mass "m" hangs from the distal end of a cantilever 310 supported at its proximal end, and the cantilever 310 carries a piezo PZT transducer 314.

Figure 17:
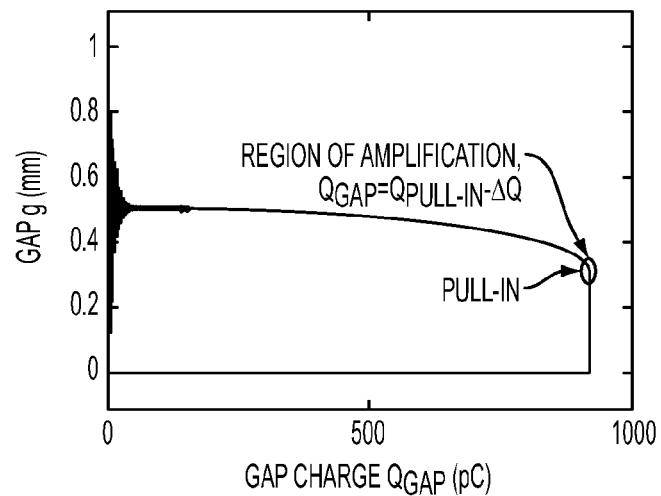
FIG. 17 is a plot illustrating measured variation of actuation charge vs. gap width (in mm) for the radioisotope biased mechanical amplifier, in accordance with a preferred embodiment of the present invention.

For mechanical amplification, cantilever 310 is biased at a charge Q that is slightly lower than the pull-in charge, as shown in the data plotted in FIG. 17. Any small increment in charge $Q_{Gap}$ results in pull-in of cantilever 310, resulting in a large tip-displacement, and hence mechanical amplification.

Zero-Powered Fissile Material Detector

Sensor 300 provides is an improved means for the detection and prevention of the clandestine transport of fissile materials (including $^{235}U$ and $^{239}Pu$) for producing weapons of mass destruction. We propose to sense both the neutrons and the relatively high intensity of γ rays (E.g. >3:0 MeV) that are emitted from short-lived fission fragments [10, 11].

Principle of Operation

Figure 18A:
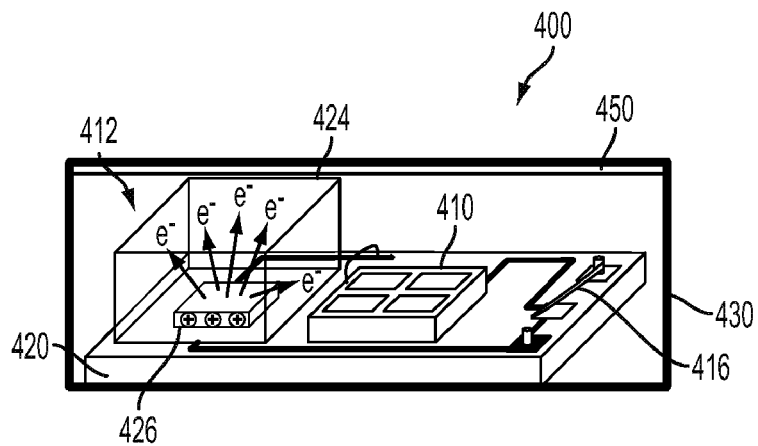
FIG. 18a is a perspective view of the fissile material detector incorporating the radioisotope biased mechanical amplifier, in accordance with a preferred embodiment of the present invention.
Figure 18B:
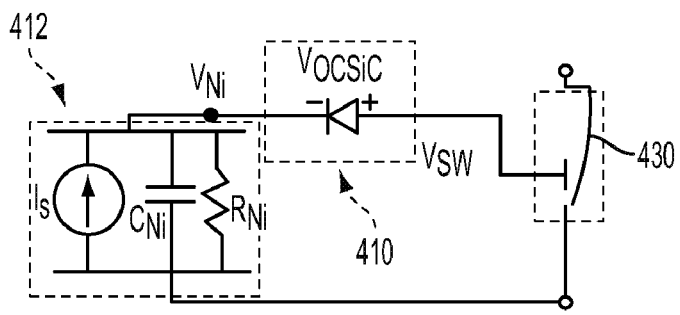
FIG. 18b is a schematic diagram illustrating the electrical circuit of the fissile material detector incorporating the radioisotope biased mechanical amplifier, in accordance with a preferred embodiment of the present invention.
Figure 18C:
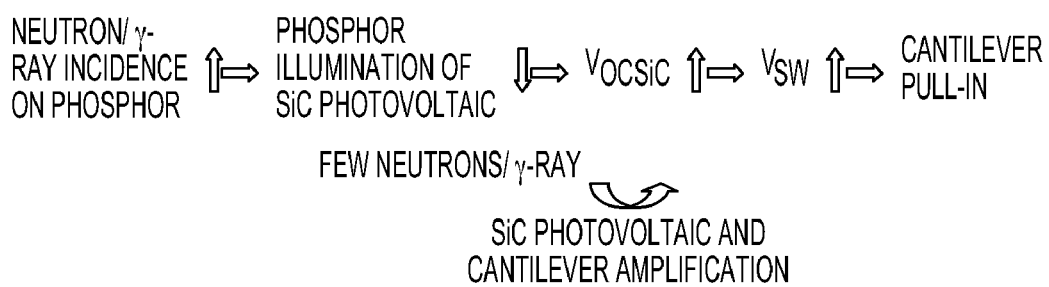
FIG. 18c is a schematic diagram illustrating the working principle of the fissile material detector incorporating the radioisotope biased mechanical amplifier, in accordance with a preferred embodiment of the present invention.

The detector's principle of operation is illustrated in FIGS. 18a-18c. The hybrid on-chip radioisotope powered fissile material detector 400 comprises a SiC photo/rad detector or diode 410, a radioisotope source 412 and a cantilever 416 that biased near pull-in. Detector 400 in prototypes has been configured on a substrate or printed circuit board 420 which supports a conductive metal package or box 424 that functions as a collector for charge emitted from a radioisotope emitter such as the Nickel-63 thin film segment 426. All of the foregoing are enclosed within a vacuum-pumped faraday cage shield 430 which has an interior surface proximate to SiC diode 410 and covered in a phosphor segment 450 comprising radiation resistant neutron phosphor (e.g., ZnS:Ag, ZnS:Cu, or $Gd_2O_2AS$:Tb) and/or γ-ray (NaI:Tl) phosphor for photovoltaic illumination of the SiC photo/rad detector 410, upon incidence of neutrons or γ-rays from fissile materials. Radioisotope source 412 effectively provides a current source $I_S$, shunted by an intrinsic capacitance $C_{Ni}$ and resistance $R_{Ni}$, across which are developed a radioisotope source voltage $V_{Ni}$, as shown in FIG. 18c.

Incident neutrons/γ rays passing through the metal shield excite the phosphors 450, which in turn excite electron hole pairs in the SiC betavoltaic 410, raising the open circuit voltage of the betavoltaic, which in turn increases the actuation voltage of the cantilever 416, and leads to pull-in of the cantilever radioisotopically biased near pull-in. An indirect conversion of neutrons/γ rays to voltage is employed because the radiation resistant radio luminescent phosphors 450 are necessary to shield the SiC betavoltaic 410 from radiation damage. The use of micro-mechanical switches results in a complete "1" or "0" switching, can be used to "wake-up" the sensor electronics, which might be "asleep" until something is detected, and hence conserve battery power. The novel detector 400 could really consume zero power in detect mode, allowing long term monitoring in hostile environments where battery replacement is not feasible, and the power required to bias the cantilevers are provided by radioactive thin film. The beta particles generate Bremsstrahlung, whose energy is low enough (<80 keV) that will not interfere with the higher energy X-rays to be detected due to external fission.

Other Applications of the Radioisotope Biasing Architecture

The radioisotope biasing architecture can be readily applied to a multitude of physical sensors, employing a capacitance sensitive to that physical quantity. For example, any capacitor (e.g., 110) sensitive to temperature, pressure, chemical/biological agents can be biased to develop self-powered sensors. The sensitivity can be increased to completely switch the MOSFETs ON or OFF, which could be used to digitally wake up a mote or trigger actuation of a system in "sleep mode".

In conclusion, the present invention comprises a new approach to making, adjusting and using sensors. Although the invention has been disclosed in terms of a number of preferred embodiments and numerous variations thereon, it will be understood that numerous additional modifications and variations could be made thereto without departing from the scope of the invention as defined in the following claims.

The invention claimed is:

1. A self-powered physical parameter sensor comprising:
   (a) a sensing circuit element selected from the group comprising
   Photo Diode and Capacitor, wherein said sensing circuit comprises a SiC photo/rad detecting diode providing a voltage characteristic that varies in response to changes in temperature when illuminated by a radioisotope source;
   (b) a portable, self contained very low external emission radioisotope source that is configured to provide power to the sensing circuit element for an operational life of one or more decades;
   (c) output signal generating circuitry coupled to the sensing circuit element to provide an output signal responsive to a sensed physical parameter; and
   (d) a second radioisotope source positioned to illuminate the SiC photo/rad detecting diode, wherein said SiC photo/rad detecting diode provides a voltage characteristic that varies in response to changes in temperature when illuminated by the second radioisotope source.

2. The self-powered physical parameter sensor of claim 1 wherein the radioisotope source comprises a segment of radioactive material positioned to emit beta particles that impinge upon a metal collector, to generate a supply voltage and supply current.

3. The self-powered physical parameter sensor of claim 2 wherein the radioactive material comprises Nickel-63.

4. The self-powered physical parameter sensor of claim 3 wherein the Nickel-63 material comprises a 2-3 milliCurie Nickel-63 thin-film emitting low energy j3-particles with penetration depths <10 μm in solids, whereby the radioisotope source can be deployed safely without substantial shielding.

5. The self-powered physical parameter sensor of claim 2 wherein the radioactive material segment is enclosed within the metal collector to provide a vacuum.

6. The self-powered physical parameter sensor of claim 1, wherein said sensing circuit comprises a polymer capacitor providing a capacitance that varies in response to changes in relative humidity.

7. The self-powered physical parameter sensor of claim 1, wherein said sensing circuit comprises a polymer capacitor providing a leakage resistance that varies in response to changes in relative humidity.

8. The self-powered physical parameter sensor of claim 1 wherein the sensor provides a linear response to the sensed physical parameter.

9. The self-powered physical parameter sensor of claim 1 wherein the sensed physical parameter is selected from the group consisting of temperature, shock, chemical concentrations and humidity.

10. The sensor of claim 1 wherein the output signal generating circuitry comprises a FET having a gate coupled to the source and to the sensing circuit element.

11. The sensor of claim 10 wherein the FET is a MOSFET.

12. A self-powered physical parameter sensor comprising:
(a) a sensing circuit element selected from the group comprising
Photo Diode and Capacitor;
(b) a portable, self contained very low external emission radioisotope source that is configured to provide power to the sensing circuit element for an operational life of one or more decades;
(c) output signal generating circuitry coupled to the sensing circuit element to provide an output signal responsive to a sensed physical parameter;
d) a mechanical amplifier including an electrically responsive spring biased member having a "pull-in" position corresponding to a closed circuit;
e) a shield having an interior surface carrying a radiation resistant neutron-responsive phosphor, configured to generate photons in response to the presence of neutrons;
f) wherein said sensing circuit comprises a SiC photo/rad detecting diode providing a voltage characteristic that varies in response to changes in photovoltaic illumination; and
g) said SiC photo/rad detecting diode being positioned proximate said phosphor such that whenever said phosphor is exposed to neutrons from, for example, nearby fissile material, said phosphor generates photons detected by said SiC photo/rad detecting diode, which, in response, modulates the voltage applied to the spring biased member to generate a detector output signal indicating the presence of a neutron source.

13. A self-powered physical parameter sensor comprising:
(a) a sensing circuit element selected from the group comprising
Photo Diode and Capacitor;
(b) a portable, self contained very low external emission radioisotope source that is configured to provide power to the sensing circuit element for an operational life of one or more decades;
(c) output signal generating circuitry coupled to the sensing circuit element to provide an output signal responsive to a sensed physical parameter;
d) a mechanical amplifier including an electrically responsive spring biased member having a "pull-in" position corresponding to a closed circuit;
e) a shield having an interior surface carrying a radiation resistant γ ray responsive phosphor, configured to generate photons in response to the presence of the presence of γ rays;
f) wherein said sensing circuit comprises a SiC photo/rad detecting diode providing a voltage characteristic that varies in response to changes in photovoltaic illumination; and
g) said SiC photo/rad detecting diode being positioned proximate said phosphor such that whenever said phosphor is exposed to γ rays from, for example, nearby fissile material, said phosphor generates photons detected by said SiC photo/rad detecting diode, which, in response, modulates the voltage applied to the spring biased member, to generate a detector output signal indicating the presence of a γ ray source.

* * * * *